Nov. 18, 1924. 1,516,146
E. BUCKINGHAM
AUTOMATIC LATHE
Filed March 1, 1921 2 Sheets-Sheet 1
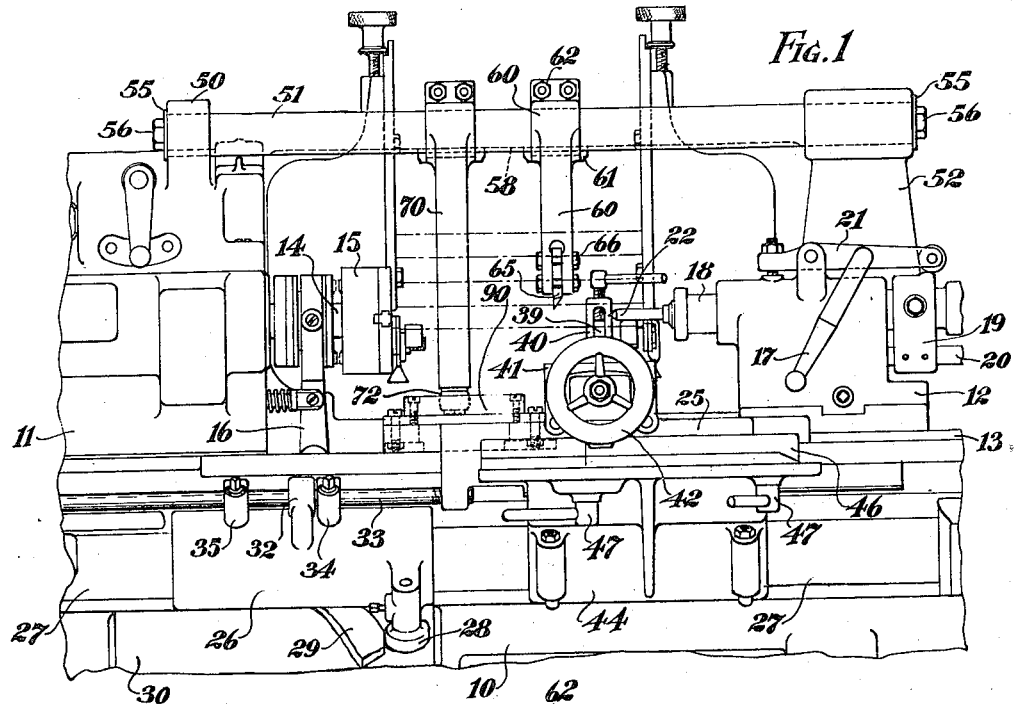
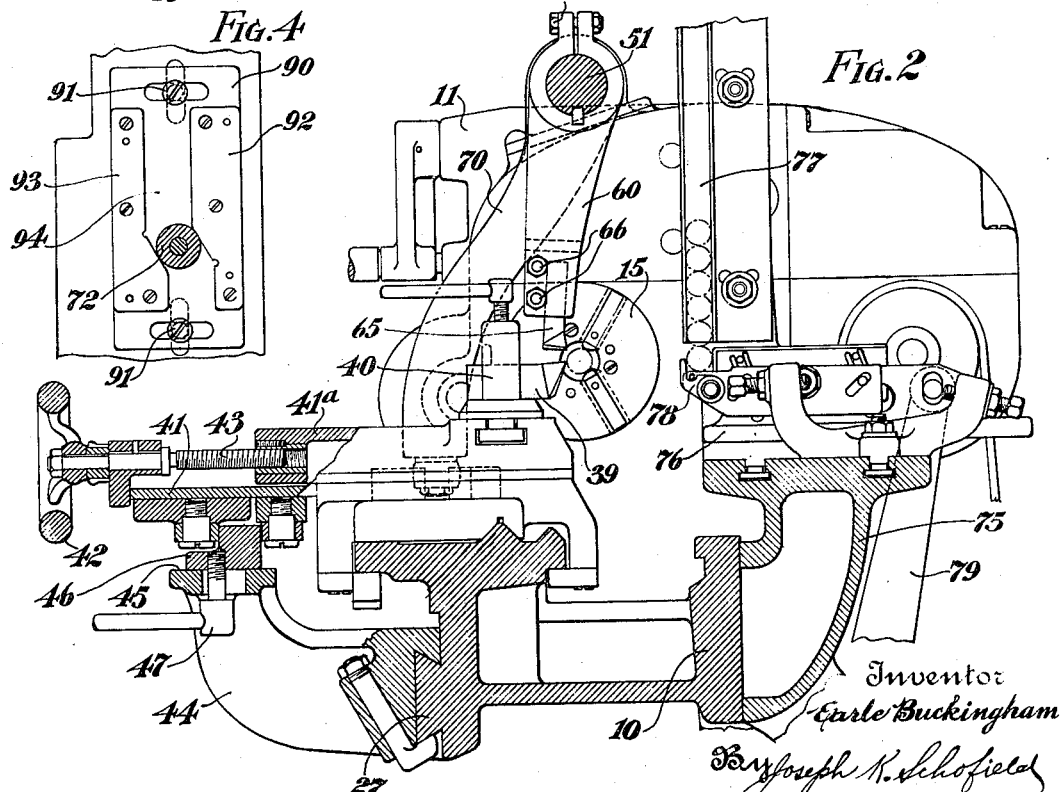

Nov. 18, 1924.
E. BUCKINGHAM
AUTOMATIC LATHE
Filed March 1, 1921    2 Sheets-Sheet 2
1,516,146
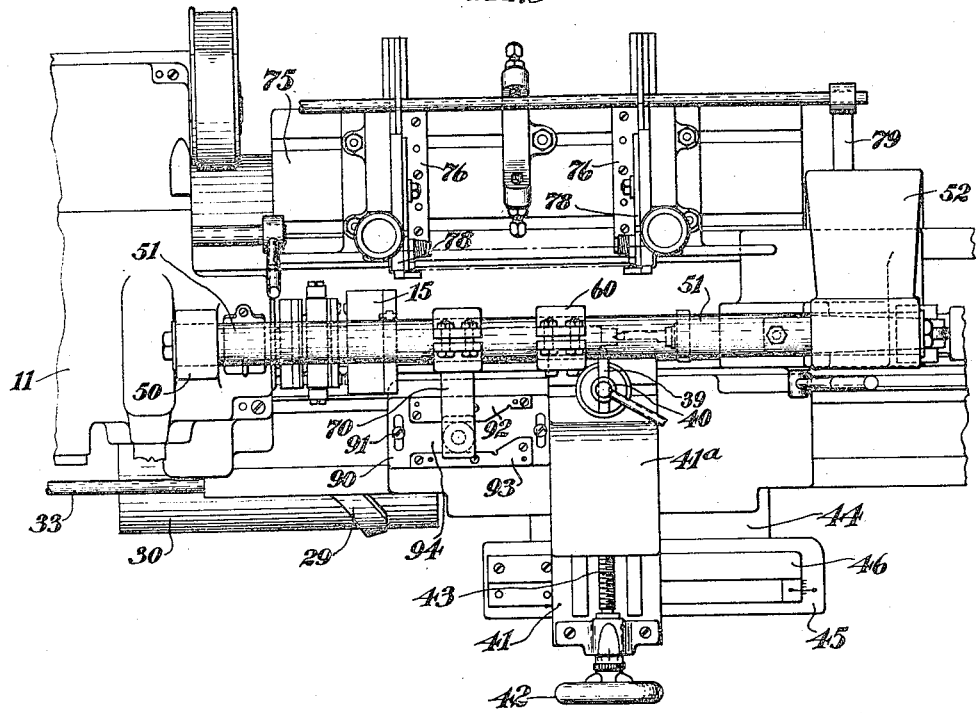
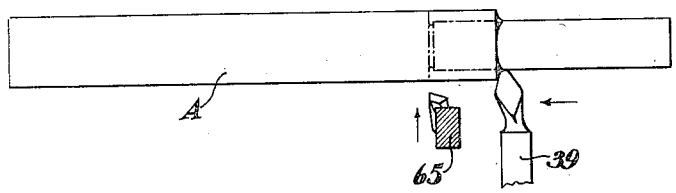
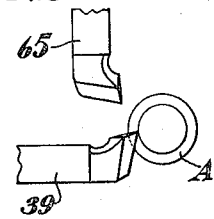
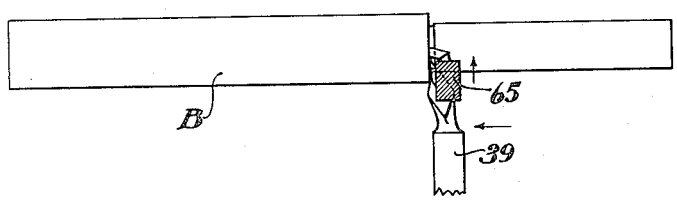
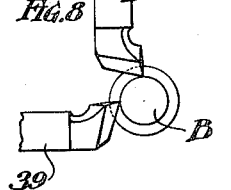
Inventor
Earle Buckingham
By Joseph K. Schofield
Attorney Patented Nov. 18, 1924.

1,516,146

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

AUTOMATIC LATHE.

Application filed March 1, 1921. Serial No. 448,906.

*To all whom it may concern:*

Be it known that I, EARLE BUCKINGHAM, a citizen of the United States, residing at Hartford, in the county of Hartford and State of Connecticut, have invented certain new and useful Improvements in Automatic Lathes, of which the following is a specification.

This invention relates to lathes and in particular to tool feeding mechanism for operating a supplementary tool on a lathe of the type disclosed in Patent 1,252,928 granted to Müller, January 8th, 1918.

An object of this invention is to provide a lathe of the type shown in the above mentioned patent with a supplemental tool co-operating with a tool mounted on the tool carriage, and adapted to take a cross or transverse cut in the blank being operated on during, or immediately after, the tool carriage has completed its stroke. Another object of the invention is to so mount this supplemental tool and its operating means that it may be actuated to engage the blank being operated on by the longitudinal movement of the tool carriage. Another object of the invention is to so mount this supplemental tool that it will not interfere with or restrict the operation of the automatic mechanism of the lathe. Particularly, the position and arrangement of this supplemental tool and its actuating mechanism is such that it will not obstruct the operation of the automatic feeding mechanism on the lathe in which the blank to be operated upon is transferred from a magazine located in rear of the lathe to its operative position between the centers.

With these and other objects in view, my invention consists in the features of construction and operation set forth in the following specification and illustrated in the accompanying drawings.

In the accompanying drawings annexed hereto and forming a part of this specification, I have shown my invention embodied in an automatic lathe of the above mentioned type but it will be understood that the invention can be otherwise embodied and that the drawings are not to be construed as defining or limiting the scope of the invention, the claims appended to this specification being relied upon for that purpose.

In the drawings:

Figure 1 is a front elevation of a portion of an automatic lathe of the type disclosed in the above mentioned patent showing my supplemental tool in operative position.

Fig. 2 shows a transverse sectional view of a lathe provided with my invention taken on line 2—2 of Fig. 1.

Fig. 3 is a plan view of the parts shown in Fig. 1.

Fig. 4 is a detail view of a portion of the tool carriage showing the guiding means to actuate the supplemental tool.

Figs. 5, 6, 7 and 8 are diagrams showing the tools in different operative positions relative to the work.

In the above mentioned drawings I have shown but one modification of my invention which is now deemed preferable, but it is to be understood that changes and modifications may be made within the scope of the invention without departing from the spirit of the invention.

Briefly, my invention in its broadest aspect comprises the following principal parts; first, a lathe bed or base; second a headstock having means for mounting and rotating a blank in operative position to be acted on by the tools; third, an automatically operated tailstock to engage and support the work at its opposite end when in operative position; fourth, a tool carriage longitudinally slidable on the bed or base of the lathe and having a tool mounted in position to engage the blank; fifth, means to feed said tool carriage and tool longitudinally of the work; sixth, automatic loading or blank transferring mechanism in which blanks to be operated on are transferred from a magazine mounted in rear of the base to operative position; and seventh, a supplemental tool co-operating with said first mentioned tool and adapted to be oscillated transversely of the lathe ways into and out of blank engaging position.

Referring more in detail to the figures of the drawing, at 10 is shown a base on which is mounted a headstock 11 and a tailstock 12. The headstock 11 is rigidly and permanently secured to ways 13 on the upper surface of the base 10 and is provided with a rotating spindle 14 carrying a chuck 15. Preferably this chuck 15 is automatic in its action and is actuated by movement of a lever 16, the movement of the lever 16 being controlled by a suitable cam (not shown).

The tailstock 12 is preferably slidably mounted on the ways 13 and is also preferably automatic in its action. To quickly adjust the position of the tailstock 12 along the ways 13, a lever 17 is provided. The tailstock 12 is provided with a dead spindle or plunger 18 moved forward and rearward relative to the tailstock 12 by means of a member 19 actuated by a rod 20 which is in engagement with a suitable cam (not shown). A lever 21 mounted on the upper surface of the tailstock 12 serves to clamp the plunger 18 in any adjusted position when the plunger 18 has been moved so that center 22 is in engagement with the blank being operated on.

Also mounted on the ways 13 is a carriage 25 adapted to slide longitudinally along the base 10. This is preferably controlled by a slide 26 slidably mounted on a dovetail projection 27 provided on the front vertical surface of the base 10. The slide 26 carries a roller 28 which is in engagement with cam strips such as shown at 29 on a cam drum 30. Rotation of the drum 30 serves to force the slide 26 longitudinally along the base 10 in accordance with the disposition of strips 29. The slide 26 also carries a projection 32 surrounding a rod 33 threaded or otherwise secured into the carriage 25. On the rod 33 are collars 34 and 35, the position of which may be varied along the rod 33. From the above it will be seen that movement of the slide 26 longitudinally of the base 10 will force the carriage 25 longitudinally variable distances, which distance is controlled by the position of the adjustable collars 34 and 35 on the rod 33, and the distance they are spaced apart. On the upper surface of the carriage 25 is a tool 39 secured in tool-post 40 preferably mounted on a suitable cross slide 41, the position of which transversely of the carriage 25 may be varied by a taper bar mounted just below it, and by hand wheel 42.

In turning cylindrical work the supplementary cross slide 41ª is adjusted by means of the hand wheel 42 controlling the screw 43. In order to turn tapered work the following construction is provided. A bracket 44 is mounted on and suitably clamped to the dovetailed projection 27 and on its upper surface 45, is mounted a taper bar 46 which may be adjustably clamped in any desired position by the clamping screws 47. The taper bar 46 is engaged by rollers 48 secured to the lower surface of the cross slide 41. In either cylindrical or taper work the bar 46 may be maintained in place but so adjusted that it does not move the cross slide 41.

The headstock 11 at its upper portion is provided with a projection 50 through which a hole is bored for a shaft 51. A bracket or other form of support 52 may be mounted at the rear of the base 10 and adjacent the tailstock 12 providing an additional support for the shaft 51. Shaft 51 is rotatably mounted in the projections 50 and 52 so that it is free to oscillate back and forth, but is held from endwise movement by collars 55 and nuts 56. Extending along the shaft 51 is a keyway or spline 58. On the rod 58 is an arm 60 adjustably mounted along the shaft 51 and having a key 61 in engagement with the keyway 58. Arm 60 is also provided with clamping screws 62, this construction permitting the arm 60 to be rigidly clamped on the shaft 51 in any adjusted position throughout its length. At the lower end of the arm 60 is a suitable tool 65 which may be adjusted relative to the arm 60 and clamped by means of screws 66. Also mounted on the shaft 51 is an actuating arm 70. This is adjustably clamped to the shaft 51 by a construction similar to that used for the arm 60. The arm 70 at its lower end is provided with a suitable roller 72 in engagement with a part presently to be described.

In rear of the base 10 is a bracket 75 forming a support for a blank transfer mechanism 76. Vertically above the forward portion of the transfer mechanism shown generally at 76 is a magazine 77 adapted to hold a number of blanks to be operated on, preferably in a vertical row as shown clearly in Fig. 2. The transfer mechanism 76 is provided with a movable member or slide 78 which at a predetermined time in the cycle of operation of the lathe advances so that the lower blank in the magazine is forced forwardly into alignment with the axis of the chuck 15 and the dead center 22. This advancing movement is accomplished by a lever 79 controlled by a suitable cam (not shown). All of the parts of the transfer mechanism are in rear of the axis of the blanks when in operative position and the movement of the member 78 is horizontal in a forward direction to advance the blanks one at a time into operative position.

The timing of the automatic mechanisms is such that after the operation on one blank is completed, the tailstock spindle 18 is withdrawn, and the chuck 15 opens allowing the completed blank to drop out. The tool carriage 25 is then moved back to its initial position and a new blank placed in position by the transfer mechanism 76. The transfer mechanism then moves back into position to pick up a new blank.

Mounted on the upper and forward surface of the carriage 25 is a plate 90 which may be adjustably secured in any position to carriage 25 by means of the bolts 91 passing through slots respectively provided in the carriage 25 and the plate 90. The plate 90 is provided with two longitudinal strips one on either side, 92 and 93. These are separated a uniform distance apart throughout their length and are shaped as shown in Fig. 4. This opening 94 formed between the plates 92 and 93 is sufficiently wide for the roller 72 to operate throughout the length of movement of the carriage 25.

From the above description it will be seen that longitudinal movement of the carriage 25 along the base 10 will force the arm 70 to oscillate due to the shape of the opening 95 and, with oscillation of the arm 70, the arm 60 carrying the tool 65 will be oscillated into and out of blank engaging position. By positioning the plate 90 in a predetermined position, the arm 60 may be made to oscillate at any predetermined position in the movement of the carriage 25, and by adjustment of the tool 65 relative to arm 60 the tool 65 may cut into the blank to any predetermined diameter.

Referring to the diagrams, Figs. 5 to 8, in Figs. 5 and 6 a blank is shown in which the longitudinally acting tool 39 has completed a portion only of its cut. The position of tool 65 is shown as retracted as it has not yet started to move and cut into the blank. This occurs when the roller 72 on the arm 70 has entered the oblique portion of the opening 94 formed between strips 92 and 93 on the plate 90. In Figs. 7 and 8 is shown the position of tools 39 and 65 relative to a blank B at the completion of their operation. The tool 39, which has completed its longitudinal movement, is held in its final position and the blank is not dropped from the machine until the tool 65 has made its transverse movement and cut into the blank B as shown in Fig. 7 thus forming a right angle shoulder or any other shape of shoulder that may be desired. Fig. 8 shows an end view of the blank and tools in this position and indicates clearly that the tool 65 does not interfere in any way with the operation of tool 39. It is also apparent from the Figs. 6 and 8 that tool 65 does not extend into the path of or in any way interfere with the operation of the blank transferring member 78.

Immediately after the tools have reached the positions shown in Figs. 7 and 8, the tailstock plunger 18 is withdrawn and the chuck 15 opens, thus allowing the blank to fall from the machine. As soon as this takes place, the tool carriage 25 is moved to the right to its initial position, thus carrying the tool 39 beyond the position occupied by a blank. Simultaneously with this right hand movement of the carriage 25, the arm 70 is oscillated, thus withdrawing the tool 65 from engaging with the blank. The position of the tools 39 and 65 and the carriage 25 is such that they are now ready for operation upon a new blank. This is advanced by the blank transferring mechanism 76 upon the completion of which advancing movement the tailstock plunger 18 is moved into blank engaging position, and the chuck 15 closes. The machine is then ready to begin operation upon the new blank.

What I claim is:

1. A lathe comprising in combination, a base, a blank holding magazine mounted thereon, transfer mechanism adapted to automatically move a blank from said magazine to operative position on said base, means to rotate said blank, a tool carriage movable longitudinally along said base, an oscillating shaft mounted above said base and transfer mechanism, a tool holding arm mounted on said shaft, and actuating means for said tool holding arm to move a tool on said arm transversely of said base into and out of blank engaging position at different predetermined positions of said carriage, said actuating means comprising an arm connected to said shaft and engaging co-acting means on said tool carriage.

2. A lathe comprising in combination, a base, a blank holding magazine mounted in rear of said base, transfer mechanism adapted to automatically move a blank from said magazine to operative position on said base, means to rotate said blank, a tool carriage movable longitudinally along said base, an oscillating shaft mounted above said base and forward of said magazine, a tool holding arm depending from said shaft, and actuating means for said tool holding arm to move a tool on said arm into and out of blank engaging position at different predetermined positions of said carriage, said actuating means comprising an arm connected to said shaft and engaging co-acting means on said tool carriage.

3. A lathe comprising in combination, a base, a blank holding magazine mounted in rear of said base, transfer mechanism adapted to automatically move a blank from said magazine to operative position on said base, means to rotate said blank, a tool carriage movable longitudinally along said base, an oscillating shaft mounted above said base and forward of said magazine, a tool holding arm depending from said shaft, and actuating means for said tool holding arm to move a tool on said arm transversely of said base into and out of blank engaging position at different predetermined positions of said carriage, said actuating means comprising an arm connected to said shaft and engaging co-acting means on said tool carriage.

4. A lather comprising in combination, a base, a blank holding magazine mounted in rear of said base, transfer mechanism adapted to automatically move a blank from said magazine to operative position on said base, means to rotate said blank, a tool carriage movable longitudinally along said base, an oscillating shaft mounted above said base and forward of said magazine, a tool holding arm depending from said shaft, and actuating means operated by movement of said tool carriage for said tool holding arm to move said tool on said arm into and out of blank engaging position at different predetermined positions of said carriage, said actuating means comprising an arm connected to said shaft and engaging co-acting means on said tool carriage.

In testimony whereof, I hereto affix my signature.

EARLE BUCKINGHAM.